United States Patent [19]

Morrissy

[11] 4,165,922

[45] Aug. 28, 1979

[54] LIQUID CRYSTAL CELL

[75] Inventor: Joseph H. Morrissy, Thaxted, England

[73] Assignee: International Standard Electric Corporation, New York, N.Y.

[21] Appl. No.: 784,201

[22] Filed: Apr. 4, 1977

[30] Foreign Application Priority Data

May 4, 1976 [GB] United Kingdom ............... 18157/76

[51] Int. Cl.$^2$ ............................................. G02F 1/13
[52] U.S. Cl. ..................................... 350/341; 350/340
[58] Field of Search .................. 350/160 LC, 340, 341

[56] References Cited

U.S. PATENT DOCUMENTS

| 3,656,834 | 4/1972 | Haller et al. | 350/150 |
| 3,728,008 | 4/1973 | Allan et al. | 350/160 LC |
| 3,912,369 | 10/1975 | Kashnow | 350/160 LC |

OTHER PUBLICATIONS

Schiekel et al., "Deformation of Nematic Liquid Crystals with Vertical Orientation in Electrical Fields", *Applied Physics Letters*, vol. 19, pp. 391–393, Nov. 15, 1971.

*Primary Examiner*—Edward S. Bauer
*Attorney, Agent, or Firm*—John T. O'Halloran; Philip Sperber

[57] ABSTRACT

A nematic liquid crystal cell operating in a field effect scattering mode employs a surfactant to provide homogeneous random alignment of the nematic director. Field effect scattering mode operation improves over dynamic scattering mode operation by using an electric field to switch between homeotropic and homogeneous random alignment.

2 Claims, 1 Drawing Figure

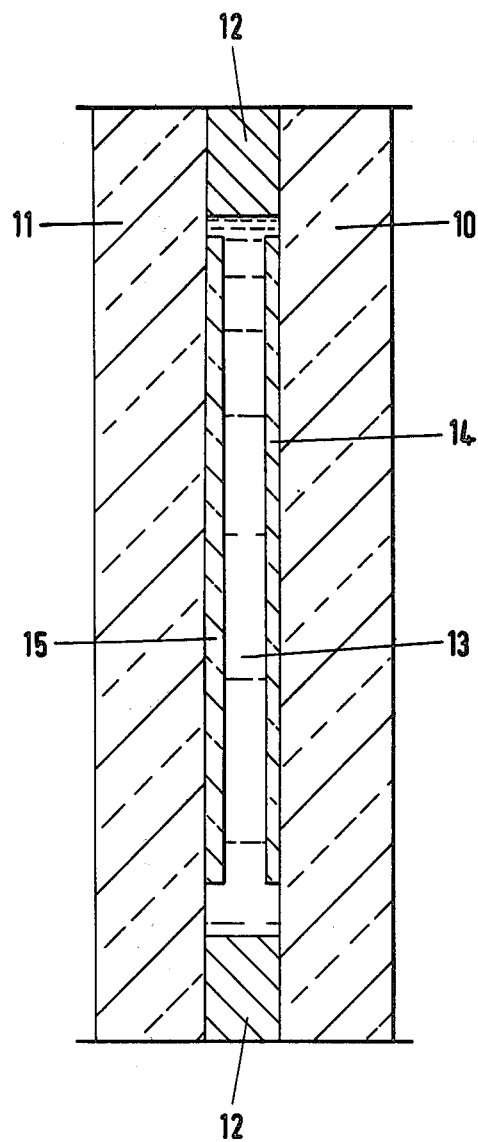

LIQUID CRYSTAL CELL

FIELD OF THE INVENTION

This invention relates to nematic liquid crystal cells, and in particular to such cells operating in a field effect scattering mode.

BACKGROUND OF THE INVENTION

The behaviour and appearance of nematic liquid crystal cells having a thin layer of liquid crystal medium depends upon the molecular alignment within the layer. The operation of field effect cells normally involves switching one or more portions of a layer between 'homeotropic' alignment in which the molecules are aligned normal to the layer, and 'homogeneous parallel' alignment in which all the molecules at any particular depth in the layer are aligned in a particular direction in the plane of the layer. In a twisted nematic cell the homogeneous parallel alignment is in one particular direction at one surface of the layer and in a different direction at the other. At intermediate points in the thickness of the layer the alignment directions are in intermediate directions. This invention concerns constructions of a cell designed to provide 'homogeneous random' alignment state in which at any particular depth in the layer all the molecules are aligned in the plane of the layer but lie in random directions within that plane.

Homogeneous random alignment can be provided by arranging for the liquid crystal layer to be bounded by a surface treated with a suitable surfactant, such as chloro trimethyl silane. Alternatively, in the case of a nematic exhibiting negative dielectric anisotropy, homogeneous random alignment can in suitable circumstances be obtained by the application of an electric field to a layer previously in homeotropic alignment.

SUMMARY OF THE INVENTION

According to the present invention, there is provided a field effect scattering mode liquid crystal cell having a layer of high resistivity nematic liquid crystal medium sandwiched between two electroded plates at least one of which is transparent, which cell is provided with surface alignment means for the liquid crystal layer such that by the application or removal of an electric potential between the electrodes, the nematic direction of at least a portion of the layer can be switched between homeotropic alignment and homogeneous random alignment.

BRIEF DESCRIPTION OF THE DRAWINGS

FIG. 1 is a sectional view of a liquid crystal cell according to the invention.

DESCRIPTION OF THE PREFERRED EMBODIMENT

Referring to FIG. 1, two glass sheets 10 and 11 are secured together with a perimeter seal 12 to form an envelope filled with a thin layer 13 of a nematic liquid crystal medium. The two inner surfaces of the sheets are provided with transparent electrodes 14,15, typically formed of indium tin oxide. These electrodes overlap at least in part to define one or more shapes which are to be capable of being displayed by the cell. At least one of the inner surfaces is also provided with a surface treatment that in the absence of an applied electric field will cause the liquid crystal to be in a particular alignment state. In the case of a nematic exhibiting positive dielectric anisotropy, this state must be the homogeneous random alignment state, whereas if the liquid exhibits negative dielectric anisotropy the alignment must be homeotropic. Thus in the case of a cyano biphenyl exhibiting positive dielectric anisotropy homogeneous random alignment may be promoted by treating one of the inner surfaces with a solution of chloro trimethyl silane. In the case of a nematic exhibiting negative dielectric anisotropy such as methoxy benzylidene butyl aniline a different type of surfactant is required such as hexadecyl trimethyl ammonium bromide.

In this latter case of a nematic exhibiting negative dielectric anisotropy, care must be taken to ensure that there is no surface texture tending to promote homogeneous parallel alignment in the presence of an applied field. Also care must be taken to ensure that the surfactant is not applied in any way providing imperfect homeotropic alignment since a bias in this alignment can result in the device switching to homogeneous parallel alignment rather than to the required homogeneous random alignment state.

Both types of display make use of the difference in appearance between regions of the display that are in homeotropic alignment and those that are in homogeneous random alignment. The homeotropically aligned regions appear clear because the molecules are aligned in a single direction within the region. The regions in homogeneous random alignment appear cloudy because of the scattering of light that occurs at the boundaries of domains of different molecular orientation. A primary difference between the two cells is thus that the cell with positive dielectric anisotropy appears clear in the energised state whereas the one with negative dielectric anisotropy appears cloudy.

Since the scattering does not rely upon dynamic turbulence, there is no need for current flow through the thickness of these cells, and thus they do not require the use of any dopant to enhance their conductivity as is used in dynamic scattering cells. Thus operation in a field effect mode allows the use of lower operating currents and voltages, and avoids some of the problems associated with electrical conduction that are encountered in cells operating in a dynamic scattering mode.

It is to be understood that the foregoing description of specific examples of this invention is made by way of example only and is not to be considered as a limitation on its scope.

I claim:

1. A field effect scattering mode liquid crystal cell comprising:
   two electroded plates, at least one of which is transparent;
   a layer of high resistivity nematic liquid crystal medium sandwiched between the electroded plates, said medium comprising cyano biphenyl; and
   surface alignment means for the liquid crystal layer on at least one of said plates such that by the application or removal of an electric potential between the electrodes, the nematic direction of at least a portion of the layer can be switched between homeotropic alignment and homogeneous random alignment, said surface alignment means comprising a coating obtained from chloro trimethyl silane.

2. A method for making a field effect scattering mode liquid crystal cell comprising the steps of:

providing a pair of electroded plates at least one of which is transparent;

treating the surface of at least one of the plates with a surfactant to cause the liquid crystal to be in a one alignment state in the absence of an applied electric field; and sealing a nematic liquid crystal layer of cyano biphenyl between the plates, said layer providing another alignment state when subjected to an electric field, the treating step comprising the step of contacting the surface with chloro trimethyl silane.

* * * * *